May 28, 1963    M. WILDEMANN    3,091,172
DEVICE FOR HEATING SAUSAGES AND THE LIKE
BY VERY HIGH-FREQUENCY ENERGY
Filed Feb. 24, 1961
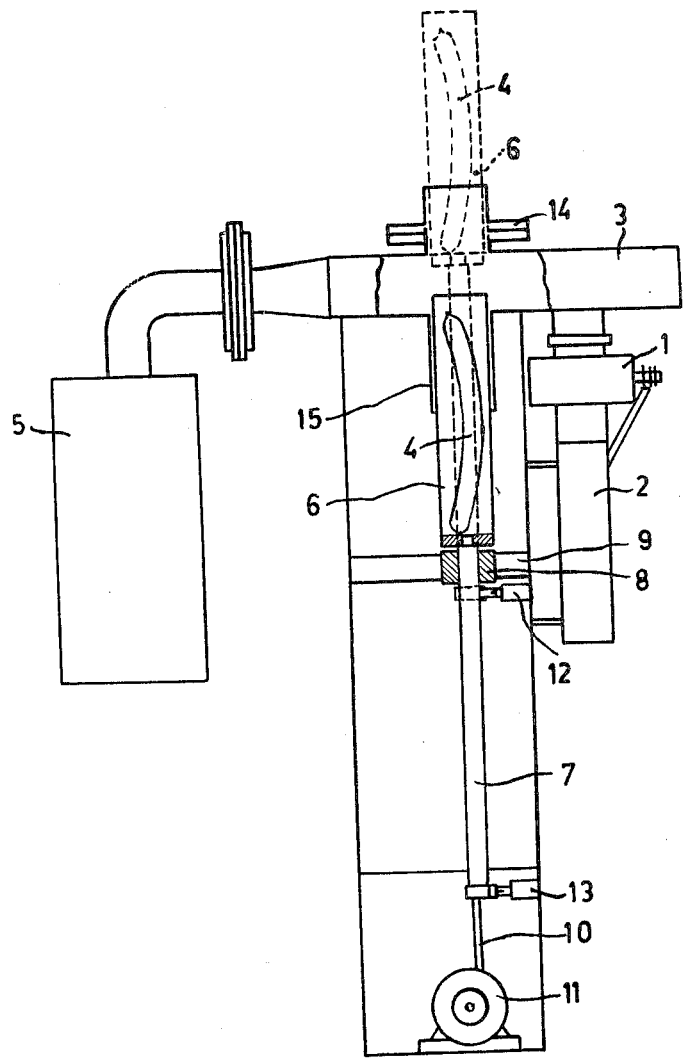
INVENTOR
MAX WILDEMANN
BY Frank R. Trifari
AGENT

United States Patent Office 3,091,172
Patented May 28, 1963

3,091,172
DEVICE FOR HEATING SAUSAGES AND THE LIKE BY VERY HIGH-FREQUENCY ENERGY
Max Wildemann, Hamburg-Lockstedt, Germany, assignor to North American Philips Company, Inc., New York, N.Y., a corporation of Delaware
Filed Feb. 24, 1961, Ser. No. 91,361
Claims priority, application Germany Mar. 8, 1960
7 Claims. (Cl. 99—427)

The invention relates to a device by which elongated objects or an organic substance, particularly sausages, can be heated with the use of very high-frequency energy. The source of energy may be a magnetron, which produces very-high-frequency energy with a wavelength of about 12 cms.

A uniform heating of the sausages throughout their length is not possible in such devices without the use of additional means. Moreover, a short heating time of about 15 to 20 seconds is desirable. The power required to this end is comparatively high, since the penetration depth of the high-frequency waves into the sausages owing to the great amount of damping is not more than a few millimetres. A substantial distribution of heat in the sausages will not take place during such a short heating period. With a high density of energy supply an abnormally high pressure occurs due to the development of vapour, such that the envelope of the sausage may burst. Bursting of the envelope may be avoided by choosing a suitable envelope, for example, of synthetic substance, but this has the disadvantage that only given kinds of sausages can be treated in the device.

The invention provides apparatus in which it is possible to heat uniformly sausages or similar elongated objects of different sizes and having different kinds of envelopes within the desired short time of about 15 seconds.

In accordance with the invention, this is achieved in a device for heating sausages or the like by very high frequency energy, by moving the sausages during the heating period transversely through a preferably rectangular hollow guide in parallel with the electrical field lines, while turning the sausage about its longitudinal axis, a travelling field being produced in the hollow guide by providing a terminal resistor at the end.

The rectangular hollow guide is preferably excited at the fundamental frequency in order to obtain the most efficient operation. It is advisable to use for the container of the object to be heated a holder comprising a glass cylinder or a cylinder of polymetacrylic esters, i.e. a material commercially available under the name of plexiglass. In order to insure a constant rotation of the holder during the heating period the holder may be provided with a screw thread and a guide, which will be described more fully with reference to the drawing.

The drawing shows diagrammatically one embodiment of the invention.

The high frequency energy coupled out of the magnetron 1, which includes a cooling system 2, excites the hollow waveguide 3 in its fundamental frequency. Approximately 80% of this energy is absorbed by the sausage 4 during the passage of the sausage 4 through the hollow guide 3. The remaining 20% of the energy is absorbed in the terminal resistor 5, provided at the end of the guide 3. By providing this terminal resistor 5, a travelling field is produced in the hollow guide 3, so that a uniform heating of the sausage 4 is obtained. The terminal resistor 5 also insures that in the no-load state of the device the magnetron is not damaged.

During the heating period the sausage 4 is passed transversely through the hollow guide 3 parallel to the electrical field lines within the area of maximum electric field intensity. When using a $H_{10}$-wave in a rectangular hollow waveguide, the passage for the object to be heated is provided as far as possible in the center of the hollow guide. In the drawing the sausage is shown in solid lines in its lowest position, and in dashed lines in its highest position. The sausage 4 is arranged in a holder 6, at the lower end of which is provided a threaded rod 7. Rod 7 is provided with a flat screw thread and is screwed into a block 8. Element 9 designates a guide rail for the guide block 8. In the screwthreaded rod is arranged a suare rod 10, which is turned by the motor 11 and which thus screws up and down the screwthreaded rod 7 with the holder 6. Element 12 denotes a terminal switch and element 13 a commutator. These switches are actuated by a switching lever provided at the lower end of the screwthreaded rod 7, i.e. the commutator 13 is actuated in the lower position of the rod 7 or of the holder 6, and the terminal switch 12 is actuated in the higher position of these parts. From the upper position of the holder 6 the object to be heated 4 is moved downwards until the commutator 13 is actuated, after which the rotation of the motor 11 is reversed and the holder 6 is moved again into the upper position. The device may, however, also be constructed similarly to the known automatic machines, in which the holder is moved upwards after a coin has been inserted, after which the holder 6 is automatically moved downwards after the heated object 4 has been removed.

At the upper opening of the hollow guide 3 provision is made of a blocking duct 14, of which the shape is such that during the heating period very-high-frequency energy is radiated. This blocking duct, or high frequency choke, may have, owing to its necessarily small height, two circular $\lambda/4$ closures. It has been found that the radiated energy during operation amounts to about 2% of the total very-high-frequency power available. It is efficient to provide a further blocking duct at the opposite opening of the hollow guide 3. This duct is designated in the FIGURE by 15.

What is claimed is:

1. Apparatus for heating a food body of elongated form, comprising a hollow wave guide having a longitudinal axis, a source of high frequency energy connected to the wave guide at one end thereof, a wave energy terminating resistor connected to the wave guide at the other end thereof thereby to produce a travelling field through the wave guide, tubular container means transparent to high frequency waves and having a longitudinal axis, means for supporting the tubular container for passage through the wave guide with its longitudinal axis transverse to the longitudinal axis of the wave guide, means for moving the container along the longitudinal axis thereof through the wave guide, means for supporting a food body in the container for movement transverse to the longitudinal axis of the wave guide, and means for rotating the food body while moving the same transverse to the axis of the wave guide.

2. Apparatus for heating a food body of elongated form, comprising a rectangular hollow wave guide having a longitudinal axis, a source of high frequency energy connected to the wave guide at one end thereof and energizing the wave guide in the $H_{10}$ mode, a wave energy terminating resistor connected to the wave guide at the other end thereof thereby to produce a travelling field through the wave guide, tubular container means transparent to high frequency waves and having a longitudinal axis, means for supporting the tubular container for passage through the wave guide with its longitudinal axis transverse to the longitudinal axis of the wave guide and substantially parallel with the lines of the electric field therein, means for moving the container along the longitudinal axis thereof through the wave guide, means for supporting a food body in the container for movement transverse to the longitudinal axis of the wave guide, and for rotating the food body while moving the same transverse to the axis of the wave guide.

3. Apparatus for heating a food body of elongated form, comprising a rectangular hollow wave guide having a longitudinal axis, two opposite walls of said guide having apertures in alignment, a source of high frequency energy connected to the wave guide at one end thereof and energizing the wave guide to produce an electric field with lines extending between said opposing walls, a wave energy terminating resistor connected to the wave guide at the other end thereof, tubular container means transparent to high frequency waves and having a longitudinal axis, means for supporting the tubular container for passage through the wave guide with its longitudinal axis transverse to the longitudinal axis of the wave guide and substantially parallel with the lines of the said electric field, means for moving the container along the longitudinal axis thereof through the said opposing apertures, means for supporting a food body in the container for movement transverse to the longitudinal axis of the wave guide, and means for rotating the food body while moving the same transverse to the axis of the wave guide.

4. Apparatus for heating a food body of elongated form, comprising a rectangular hollow wave guide having a longitudinal axis, two opposite walls of said guide having apertures in alignment, a source of high frequency energy connected to the wave guide at one end thereof and energizing the wave guide to produce an electric field with lines extending between said opposing walls, a wave energy terminating resistor connected to the wave guide at the other end thereof, cylindrical container means transparent to high frequency waves having a longitudinal axis, means for supporting the container for passage through the wave guide with its longitudinal axis transverse to the longitudinal axis of the wave guide and substantially parallel with the lines of the said electric field, means for moving the container along the longitudinal axis thereof through the said opposing apertures, means for supporting a food body in the container for movement transverse to the longitudinal axis of the wave guide, and means for rotating the food body while moving the same transverse to the axis of the wave guide, said container moving means and said rotating means comprising a screw member axially aligned with the axis of said container, a fixedly positioned threaded block member, a rotatable shaft member slidingly arranged within said screw member, and motor means for rotating said shaft.

5. Apparatus for heating a food body as claimed in claim 4 wherein said screw member has a longitudinal movement of a given amount and further comprising a switch element actuated by said screw member at the end of said movement.

6. Apparatus for heating a food body as claimed in claim 4 wherein said screw member has a longitudinal movement of a given amount and further comprising electric switch means arranged at one end of travel of the screw member for reversing its direction of movement and electric switch means arranged at the other end of travel of the screw member for stopping the same.

7. Apparatus for heating a food body as claimed in claim 4 further comprising radio frequency choke members arranged at the said apertures in said wave guide.

References Cited in the file of this patent

UNITED STATES PATENTS

| | | |
|---|---|---|
| 2,627,571 | Hiehle et al. | Feb. 3, 1953 |
| 2,632,838 | Schroeder | Mar. 24, 1953 |
| 2,659,860 | Breazeale | Nov. 17, 1953 |
| 2,817,739 | Haagensen | Dec. 24, 1957 |
| 2,820,127 | Argento et al. | Jan. 14, 1958 |
| 2,958,830 | Bird et al. | Nov. 1, 1960 |